United States Patent [19]

Schaffner

[11] Patent Number: 5,492,293
[45] Date of Patent: Feb. 20, 1996

[54] FOOT FOR THE LEG OF A PIECE OF FURNITURE

[75] Inventor: Theo Schaffner, Pfyn, Switzerland

[73] Assignee: Schaffner AG, Müllheim, Switzerland

[21] Appl. No.: 232,008

[22] PCT Filed: Aug. 4, 1993

[86] PCT No.: PCT/CH93/00195

§ 371 Date: Apr. 22, 1994

§ 102(e) Date: Apr. 22, 1994

[87] PCT Pub. No.: WO94/05184

PCT Pub. Date: Mar. 17, 1994

[30] Foreign Application Priority Data

Aug. 27, 1992 [CH] Switzerland .............. 2671/92

[51] Int. Cl.[6] ................................ A47B 91/00
[52] U.S. Cl. .................... 248/188.7; 248/188.2; 248/412
[58] Field of Search .............. 248/188.7, 188.2, 248/188.8, 188.9, 412, 411

[56] References Cited

U.S. PATENT DOCUMENTS

| 3,674,230 | 7/1972 | Propst | 248/188.8 |
|---|---|---|---|
| 3,827,663 | 8/1974 | Hinman | |
| 3,908,944 | 9/1975 | Bjork | 248/411 |
| 4,586,727 | 5/1986 | Andrieu et al. | 248/188.2 |

FOREIGN PATENT DOCUMENTS

| 0380773 | 8/1990 | European Pat. Off. |
| 415393 | 6/1925 | Germany. |
| 1010254 | 6/1957 | Germany. |
| 2037379 | 1/1972 | Germany. |
| 1282072 | 7/1972 | Germany. |
| 542093 | 12/1941 | United Kingdom. |

Primary Examiner—Leslie A. Braun
Assistant Examiner—Anita M. King
Attorney, Agent, or Firm—Anderson Kill Olick & Oshinsky

[57] ABSTRACT

The foot described has a support arm connected to the leg, the other end of the support arm being fitted with a height-adjustable foot element (8). For this purpose, the foot element has an upper surface (12) which extends, at an angle ($\alpha$) to the floor surface (10), towards the support arm (6) and which engages with a matching lower surface (14) on the support arm (6). Both surfaces (12, 14) have engagement ribs (16, 18) which run at right angles to the support arm (6). The foot (8) is connected by means of a stud (22) to a support element (32) which rests with the spring head pressed against the upper surface (38) of the support arm (6). The stud (22) passes through a long hole (30) facing the support arm (6). This design ensures that the height of the foot can be adjusted simply and reliably.

5 Claims, 1 Drawing Sheet

FOOT FOR THE LEG OF A PIECE OF FURNITURE

BACKGROUND OF THE INVENTION

The invention is directed to a foot for a leg or supporting column of a piece of furniture of where a foot element is adjustably attached to a bracket secured to the supporting column.

There are many known bases of this type, e.g. for the supporting columns of patio tables and the like. The vertically adjustable foot part is usually formed by an adjusting screw which can be screwed into the bracket and rests on the supporting plane via a head. On the one hand, screwing and unscrewing the foot part is cumbersome; on the other hand, the screws tend to rust so that vertical adjustment of the foot part is no longer possible at all.

SUMMARY OF THE INVENTION

The object of the invention is to develop a base of the type mentioned above in such a way that vertical adjustment is simpler and more dependable.

This object is met, according to the invention, by the characterizing features of a vertically adjustable foot. The foot element is adjusted vertically in the most simple manner by pressing in a springing support member so that the locking faces are disengaged and can be displaced relative to one another so that height of the foot element with respect to the bracket can be changed in the simplest manner. Since this vertical adjustment arrangement has no threaded parts, but only locking faces serving for adjustment, the operation of the parts cannot be impaired even by rust.

An embodiment example of the invention is described in more detail in the following with reference to the drawings:

DETAILED DESCRIPTION OF THE INVENTION

Figure 1:
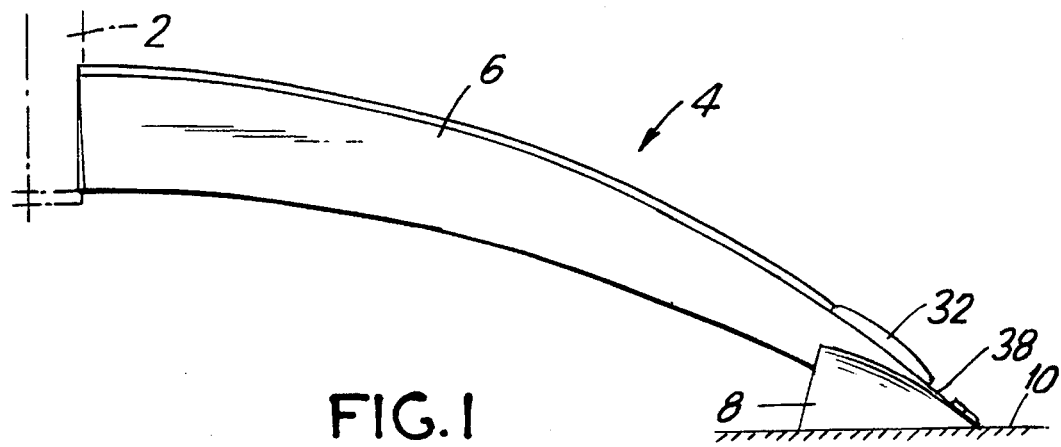
FIG. 1 is a side elevational view of a long side of a bracket embodying the present invention.
Figure 2:
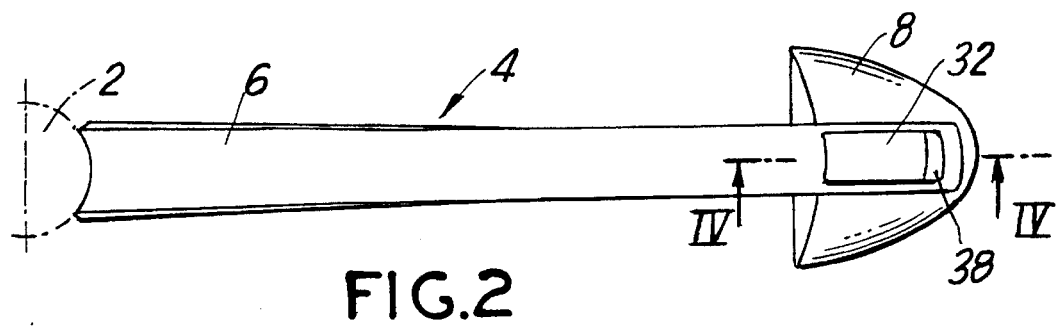
FIG. 2 is a plan view of the bracket illustrated in FIG. 1.
Figure 3:
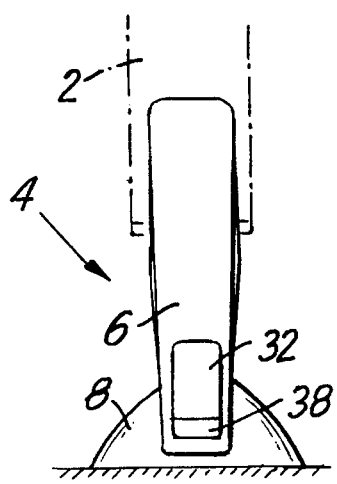
FIG. 3 is an end view of the bracket from the narrow end.
Figure 4:
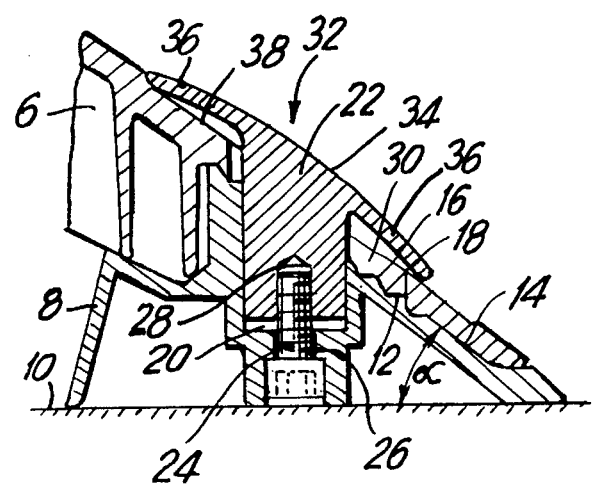
FIG. 4 is an enlarged sectional view of the bracket taken along line section IV—IV in FIG. 2.

The drawings show a foot 4 fastened to a supporting column 2 which, for example, forms part of a table. This foot 4 has a bracket 6 which is connected with the supporting column 2, for example, by screws or the like which are not shown in more detail. The end of the bracket 6 remote of the supporting column 2 has a vertically adjustable foot element 8 by, which it is supported on a supporting plane 10. The bracket 6 and/or foot element 8 can be made of metal or preferably plastic. As will be seen particularly from FIG. 4, the foot element has an upper locking face 12 cooperating with a lower locking face 14 of the bracket 6. The locking faces 12, 14 are parallel to one another and are inclined at an angle α to the supporting plane 10. Each locking face has locking ribs 16, 18 which are directed transversely to the long side of the bracket and allow the locking faces to lock together in various positions.

The foot element 8 contains a recess 20 which faces upward. A flat-sided pin 22 which is screwed together with the foot element 8 from the bottom by means of a screw 24 engages in this recess 20. For this purpose, the screw projects through a bore hole 26 in the base of the recess 20 into a threaded bore hole 28 in the pin 22. The pin projects through an elongated hole 30 in the bracket 6 which extends in the long direction of the bracket and enables a displacement of the pin 22 along the bracket. The pin 22 is connected on the upper side with a supporting member 32 which is constructed as a leaf spring and has a central region 34 which is connected with the pin 22. On either side of the central region are springing side parts 36 which face toward the bracket 6 and are supported at the upper side 38 of the bracket in a resilient manner. The upper side 38 extends substantially parallel to the locking faces 12, 14. The pin 22 and the supporting member 32 are constructed in one piece and are preferably made of plastic. The distance and accordingly the pretensioning of the supporting member 32 relative to the upper side 38 of the bracket 6 can be adjusted by continued turning of the screw 24.

The vertical adjustment of the foot element is effected in the simplest manner in that the pin 22 is moved downward vertically by pressing on the supporting member 32. In so doing, the locking faces 12, 14 are moved apart until their locking ribs 16, 18, which extend transversely to the long direction of the bracket, disengage. By displacing the supporting member 32 in the longitudinal direction of the bracket 6, the vertical position of the foot element can be adapted to irregularities of the supporting plane. By releasing the supporting member 32, the locking ribs 16, 18 of the locking faces 12, 14 lock together again in the new position. Since the locking faces 12, 14 press against one another in the intended position, unintentional disengagement and displacement of the foot element 8 relative to the bracket is prevented even if the tensioning force of the springing supporting member 32 should give.

I claim:

1. A foot for a supporting column, said foot having a bracket (6) with a long direction and adapted to be attached at a first end to the supporting column (2), a vertically adjustable foot element (8) being arranged at a second end of the bracket (6), wherein the improvement comprises that the foot element (8) has an upper locking face (12) inclined at an angle (α) relative to a supporting plane (10), and extending in the long direction of the bracket (6) and cooperating with a corresponding lower locking face (14) of the bracket (6), each of the locking faces (12, 14) having locking ribs (16, 18) extending transversely of the long direction of the bracket (6), and the foot element (8) is connected, via a pin (22) guided in an elongated hole (30) in and oriented in the long direction of the bracket (6), with a supporting member (32) arranged at an upper side (38) of the bracket (6) and supported in a resilient manner on the upper side (38) of the bracket (6).

2. The foot according to claim 1, characterized in that the upper side (38) of the bracket (6) serving to support the supporting member (32) extends parallel to the locking faces (12, 14).

3. The foot according to claim 1 or 2, characterized in that the supporting member (32) is constructed as a leaf spring and has a central region (34) which projects above the upper side (38) of the bracket (6) and is connected with the pin (22), the supporting member (32) also having springing side parts (36) facing in the direction of the bracket (6) and inclined toward the upper side (38) of the bracket (6).

4. The foot according to claims 1 or 2, characterized in that the pin (22) and the supporting member (32) are constructed in one piece and are screwed together with the foot element (8) by means of a screw (24), wherein the distance of the supporting member (32) from the foot element (8) is adjustable.

5. Foot according to claim 4, characterized in that the pin (22) and the supporting member (32) are made of plastic.

* * * * *